(12) United States Patent  
Suzuki et al.

(10) Patent No.: US 8,014,672 B2  
(45) Date of Patent: Sep. 6, 2011

(54) OPTICAL WAVELENGTH MULTIPLEXING ACCESS SYSTEM

(75) Inventors: Hiroo Suzuki, Makuhari (JP); Takashi Yamada, Makuhari (JP); Katsumi Iwatsuki, Makuhari (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 565 days.

(21) Appl. No.: 11/815,031

(22) PCT Filed: Jan. 26, 2007

(86) PCT No.: PCT/JP2007/051282  
§ 371 (c)(1),  
(2), (4) Date: Jul. 30, 2007

(87) PCT Pub. No.: WO2007/086514  
PCT Pub. Date: Aug. 2, 2007

(65) Prior Publication Data  
US 2009/0016726 A1    Jan. 15, 2009

(30) Foreign Application Priority Data  
Jan. 27, 2006    (JP) .................................. 2006-019043

(51) Int. Cl.  
*H04J 14/00*    (2006.01)

(52) U.S. Cl. ................ 398/69; 398/79; 398/68; 398/72; 398/135

(58) Field of Classification Search .................... 398/68, 398/69, 70, 79–87, 72, 135  
See application file for complete search history.

(56) References Cited

U.S. PATENT DOCUMENTS 5,212,577 A * 5/1993 Nakamura et al. .............. 398/79  
(Continued)

FOREIGN PATENT DOCUMENTS

EP    0438155    7/1991  
(Continued)

OTHER PUBLICATIONS

Supplementary European Search Report for corresponding European Patent Application No. 07707514 dated Feb. 9, 2011.

(Continued)

*Primary Examiner* — Ken Vanderpuye  
*Assistant Examiner* — Hibret Woldekidan  
(74) *Attorney, Agent, or Firm* — Workman Nydegger (57) ABSTRACT

According to the present invention, a star-type wavelength multiplexed communication network using optical TX/RX devices capable of assigning the wavelengths can be provided without using the monitoring light. In an embodiment of the present invention, an optical TX/RX device for transmitting and receiving a wavelength-multiplexed signal light comprises an optical receiver capable of varying the RX wavelength and an optical transmitter capable of varying the TX wavelength. The optical TX/RX device detects RX wavelengths not in use via the optical receiver, and assigns the RX wavelength of the optical receiver to one of the RX wavelengths not-in-use, and assigns the TX wavelength of the optical transmitter to a TX wavelength corresponding to the RX wavelength according to a correspondence table of TX and RX wavelengths in the memory. Then, the optical TX/RX device transmits a signal light on this TX wavelength, and detects the response on the RX wavelength. If the response is detected, communication is initiated using the assigned TX wavelength and the RX wavelength. If the response is not detected, the operation is repeated from the detection of RX wavelengths not in use to the transmission of the signal light on TX wavelength again.

18 Claims, 12 Drawing Sheets

U.S. PATENT DOCUMENTS

| | | | | |
|---|---|---|---|---|
| 5,559,624 | A * | 9/1996 | Darcie et al. | 398/72 |
| 5,838,470 | A * | 11/1998 | Radehaus et al. | 398/79 |
| 5,991,275 | A | 11/1999 | Abiven et al. | |
| 6,025,947 | A | 2/2000 | Sugaya et al. | |
| 6,822,743 | B2 * | 11/2004 | Trinh | 356/451 |
| 7,502,563 | B2 * | 3/2009 | Nozue et al. | 398/69 |
| 7,684,703 | B2 * | 3/2010 | Harada | 398/68 |
| 7,734,178 | B2 * | 6/2010 | Sakamoto et al. | 398/67 |
| 7,873,277 | B2 * | 1/2011 | Kazawa et al. | 398/68 |
| 2004/0179855 | A1 * | 9/2004 | Harada | 398/197 |
| 2004/0208567 | A1 * | 10/2004 | Okano et al. | 398/79 |
| 2005/0169633 | A1 * | 8/2005 | Nakagawa et al. | 398/85 |
| 2006/0104640 | A1 * | 5/2006 | Kunimatsu et al. | 398/79 |
| 2007/0047958 | A1 * | 3/2007 | Gumaste | 398/69 |
| 2008/0138072 | A1 * | 6/2008 | Sakamoto et al. | 398/68 |

FOREIGN PATENT DOCUMENTS

| | | |
|---|---|---|
| EP | 0810752 | 12/1997 |
| JP | 63316957 | 12/1988 |
| JP | 3-214831 | 9/1991 |
| JP | 09-172694 | 6/1997 |
| JP | 9-205432 | 8/1997 |
| JP | 10-51057 | 2/1998 |
| JP | 2004-274636 | 9/2004 |

OTHER PUBLICATIONS

English translation of an office action issued on May 20, 2011 in corresponding Japanese Patent Application No. 2007-535942.

* cited by examiner

OPTICAL WAVELENGTH MULTIPLEXING ACCESS SYSTEM

TECHNICAL FIELD

The present invention relates to an optical transmitter (TX) and receiver (RX) device used for wavelength multiplexed optical communication and a star-type network using the device.

BACKGROUND ART

Conventionally, in a relay network using wavelength multiplexing scheme, monitoring light with a different wavelength from signal light is used to transmit wavelength information of the signal light and the like as monitoring information for monitor and control of wavelengths to be used (Patent Document 1).

Figure 1:
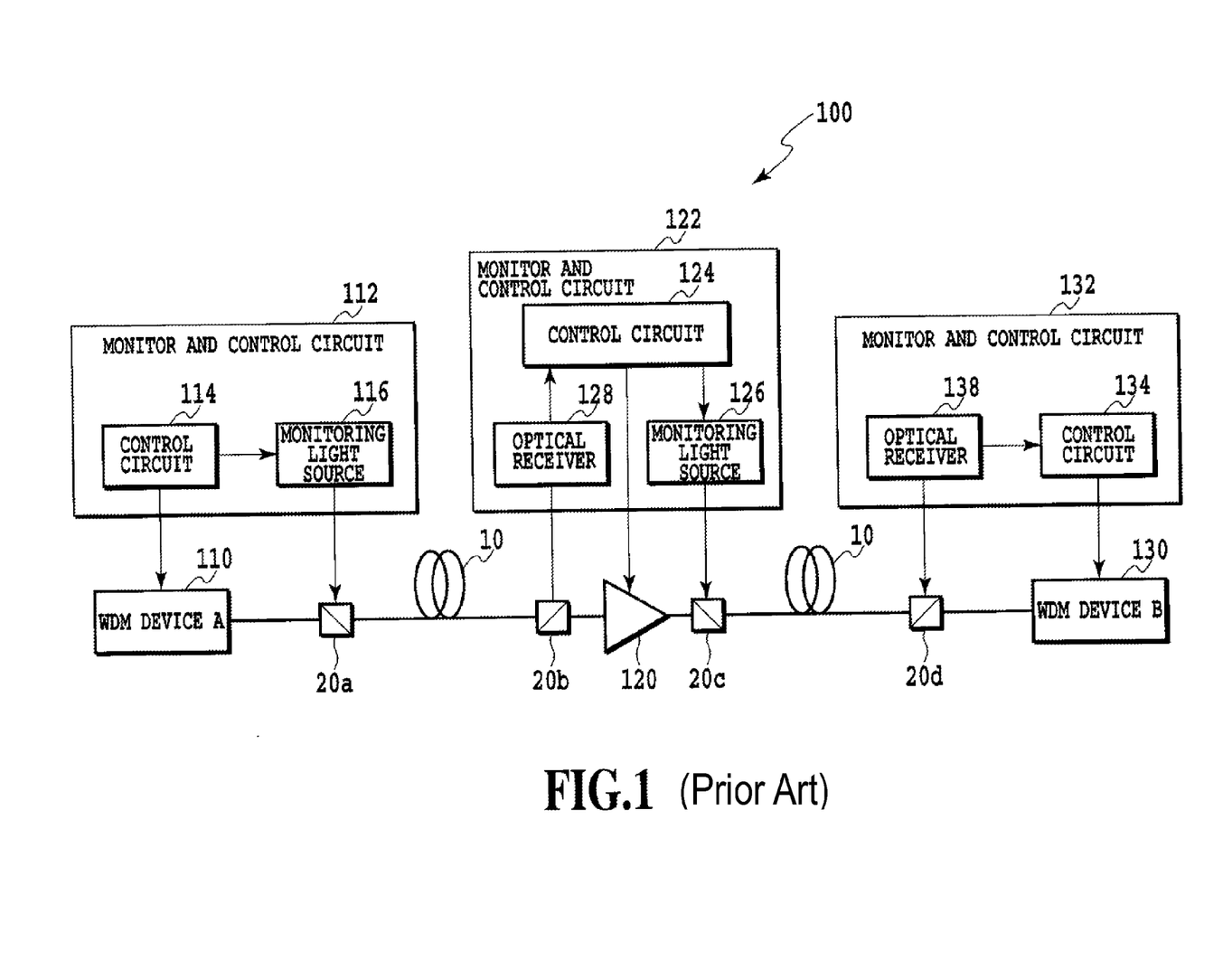
FIG. 1 is a diagram showing an exemplary configuration for monitor and control in a relay system of a conventional wavelength multiplexed communication network.

FIG. 1 shows an exemplary configuration for monitor and control in such relay network. As shown in the figure, in network 100, wavelength-multiplexed signal light is transmitted from WDM device A 110 to WDM device B 130 via linear optical repeater 120. In this case, monitoring information such as power, wavelengths in use, and the number of the wavelengths for signal light is transmitted from monitor and control circuit 112 to monitor and control circuit 132 via monitor and control circuit 122 using monitoring light with a different wavelength from the signal light.

It is required to keep the light power constant on each channel at linear optical repeater 120, even if more channels are provided in network 100 and the number of in-use wavelengths for the signal light is increased, etc., in order to prevent degradation of the transmission characteristics in the network. In this case, the monitoring information of the signal light after provided with more channels is conveyed from control circuit 114 at the transmitting side through monitoring light source 116. This monitoring light is multiplexed with the signal light at multiplexer 20a, and transmitted out to optical fiber 10.

Monitor and control circuit 122 receives the monitoring light transmitted via optical fiber 10 at optical receiver 128 and obtains the monitoring information. At the same time, monitor and control circuit 122 monitors the total light power of the signal light at the output of linear optical repeater 120, and computes the average power per channel based on the number of in-use wavelengths of the signal light obtained from the monitoring information. Monitoring control circuit 122 controls the output power of linear optical repeater 120 so that the average power becomes a desired value. Accordingly, after provided with more channels, the light power on each channel can be kept constant at linear optical repeater 120.

Further, this monitoring information is transmitted to monitor and control circuit 132 through monitoring light source 126, and received by optical receiver 138. Based on the monitoring information, control circuit 134 controls the output power of an optical amplifier in WDM device B 130 so as to be a desired value. As such, the signal light is transmitted from WDM device A 110 to WDM device B 130.

However, since the monitoring light is used in such a configuration, optical components such as light sources 116, 126, multiplexers 20a, 20c, demultiplexers 20b, 20d, and optical receivers 128, 138 are required, which are costly. Particularly, in a star-type network configuration using a power splitter network, demultiplexers and optical receivers for monitoring light are required for each subscriber terminal.

Figure 2:
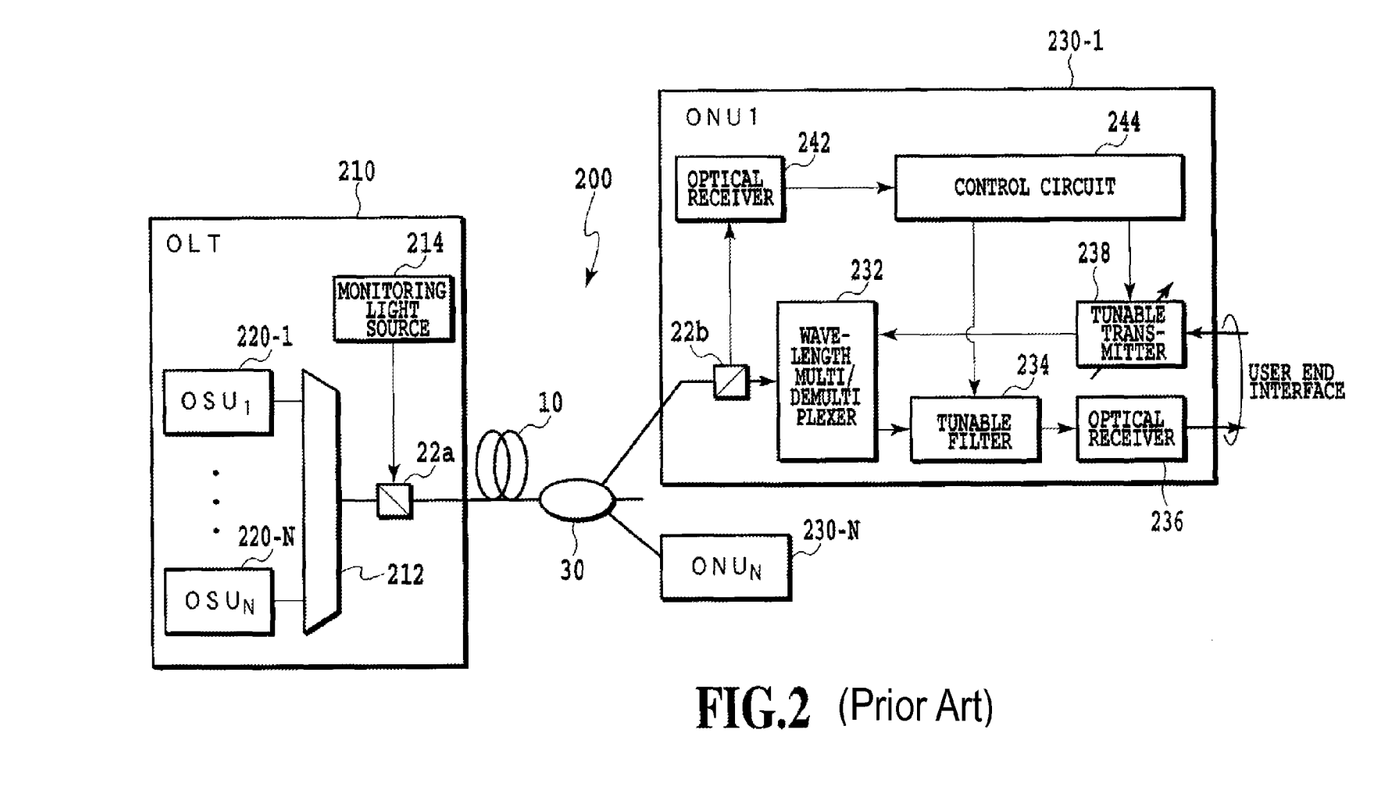
FIG. 2 is a diagram showing an exemplary configuration in which the configuration for monitor and control shown in FIG. 1 is applied to a star-type wavelength multiplexed communication network.

FIG. 2 shows an exemplary configuration in which the configuration for monitor and control shown in FIG. 1 is applied to a star-type wavelength multiplexed network. Network 200 is composed of an optical line terminal (OLT) 210 installed at a station, an optical fiber 10 through which wavelength-multiplexed signal light and monitoring light propagate, a power splitter 30 for power-splitting the signal light and the monitoring light in the ratio of 1 to N, and N optical network units (ONUs) 230-1 to 230-N, each receiving the split signal light and the split monitoring light.

In the configuration, the monitoring information is transmitted from OLT 210 out to optical fiber 10 using monitoring light source 214. The monitoring light is split into N at power splitter 30, and transmitted to ONUs 230-1 to 230-N. Each ONU 230 receives the monitoring light with optical receiver 242, and based on in-use wavelength information transmitted as the monitoring information, tunable filter 234 and optical transmitter 238 are assigned by control circuit 244 so as to receive a predetermined channel.

However, since the monitoring light is used in this configuration, light source 214 and multiplexer 22a are required in OLT 210, and the optical components such as demultiplexer 22b and optical receiver 242 are required in each ONU, which overall cost more.

Patent Document 1: Japanese Patent Laid-Open No. 10-51057

DISCLOSURE OF THE INVENTION

The present invention has been made in view of the foregoing problem, and it is an object to provide a star-type wavelength multiplexed communication network using an optical transmitter and receiver (TX/RX) device capable of assigning the wavelengths without using monitoring light.

To achieve such an object, according to the present invention, an optical TX/RX device for transmitting and receiving wavelength-multiplexed signal light comprises an optical RX means capable of varying a RX wavelength, an optical TX means capable of varying a TX wavelength, a detection means for detecting RX wavelengths not in use via the optical RX means, and a wavelength control means for assigning the RX wavelength of the optical RX means to one of the RX wavelengths detected by the detection means and for assigning the TX wavelength of the optical TX means to a TX wavelength corresponding to the assigned RX wavelength.

Further, according to an embodiment of the present invention, the optical RX means comprises a tunable filter capable of varying the RX wavelength, and an optical receiver for receiving the RX wavelength via the tunable filter.

Further, according to an embodiment of the present invention, the optical TX/RX device further comprises a storage means provided with a correspondence table between the RX wavelengths assignable for the optical RX means and the TX wavelengths assignable for the optical TX means.

Further, according to an embodiment of the present invention, the detection means scans the RX wavelengths assignable for the optical RX means, and detects the RX wavelengths not in use by measuring the RX power on each of the RX wavelengths.

Further, according to an embodiment of the present invention, a network comprises a plurality of optical TX/RX devices, and an optical line terminal connected with these optical TX/RX devices via a power splitter.

Further, according to an embodiment of the present invention, a method of assigning wavelengths for an optical TX/RX device in a network comprising a plurality of optical TX/RX devices, each with tunable upstream and downstream wavelengths, and an optical line terminal connected with these optical TX/RX devices via a power splitter, the method includes (a) detecting downstream wavelengths not in use by detecting presence or absence of downstream wavelengths from the optical line terminal via the power splitter, (b) selecting one of the detected downstream wavelengths, (c) selecting an upstream wavelength corresponding to the selected downstream wavelength, (d) transmitting a signal light at the selected upstream wavelength, (e) detecting a response to the transmitted signal light on the selected downstream wavelength, and (f) initiating communication with the optical line terminal using the selected downstream wavelength and the selected upstream wavelength if the response is detected.

Further, according to an embodiment of the present invention, the method of assigning wavelengths includes (g) repeating the steps (a) to (e) if the response is not detected.

Further, according to an embodiment of the present invention, the repeating step (g) repeats the steps (a) to (e) after a random period of time has elapsed.

Further, according to an embodiment of the present invention, the selecting step (b) randomly selects a downstream wavelength out of the detected downstream wavelengths.

According to the various aspects of the present invention, in a star-type network including a power splitter network, an optical TX/RX device capable of assigning the wavelengths can be provided without using monitoring light. Accordingly, the optical components relating to the transmission of the monitoring light such as a light source, a multiplexer, a demultiplexer, and an optical receiver can be eliminated. Further, the optical TX/RX device according to an aspect of the present invention is only required to monitor the signal power, and can be applied to various transmission frame formats. Still further, since the wavelengths can automatically be assigned with a simple algorithm, it is especially advantageous for network expansion with small start-ups, with which economy is critical.

BEST MODE FOR CARRYING OUT THE INVENTION

Hereinafter, embodiments of the present invention will be described in detail with reference to the drawings.

Figure 3:
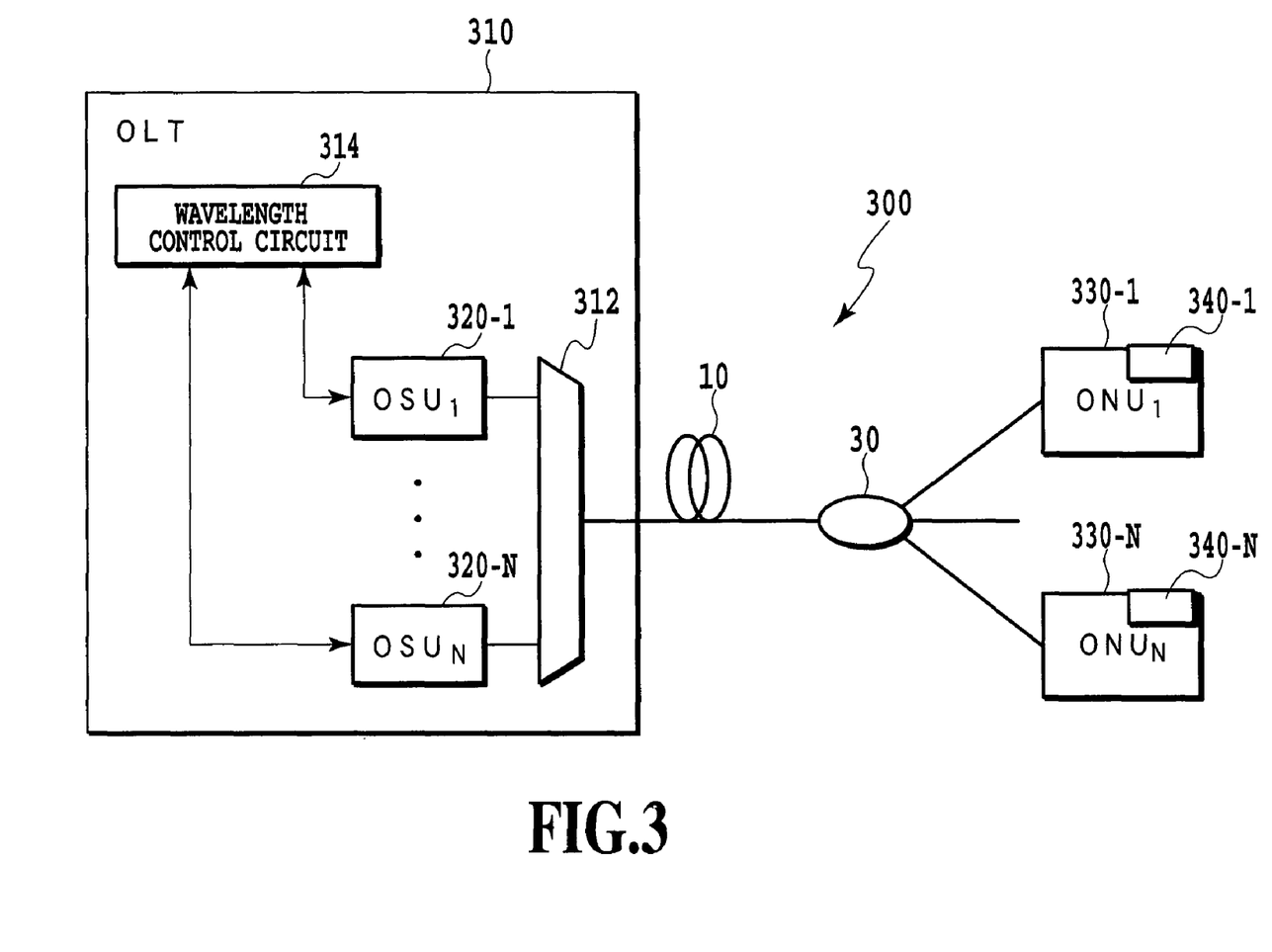
FIG. 3 is a diagram showing an exemplary configuration of a star-type wavelength multiplexed communication network according to an embodiment of the present invention.

FIG. 3 shows an exemplary configuration of a star-type network using an optical TX/RX device according to the present invention. Network 300 is composed of an optical line terminal (OLT) 310 for transmitting and receiving wavelength-multiplexed signal light, an optical fiber 10 through which the signal light propagates, a power splitter 30 for combining or splitting the optical signal with 1 to N, and N optical network units (ONUs) (optical TX/RX devices) 330-1 to 330-N each transmitting and receiving optical signal.

OLT 310 comprises N optical subscriber units (OSUs) 320-1 to 320-N each transmitting and receiving signal light with an assigned wavelength, a wavelength control circuit 314 for controlling the wavelengths of signal light used for TX and RX by the OSUs, and a wavelength multi/demultiplexer 312 for multiplexing the optical signals from the OSUs and demultiplexing the optical signals from the ONUs. OSUs 320-1 to 320-N are assigned with different wavelengths, respectively, by wavelength control circuit 314. In this case, wavelength control circuit 314 may assign these wavelengths to the OSUs in fixed or dynamic way. Alternatively, it may be configured to use an OSU with a prefixed TX and RX wavelengths and stabilize the wavelengths by the wavelength control circuit. An optical signal from an OSU assigned with a wavelength is wavelength-multiplexed by wavelength multi/demultiplexer 312 and then transmitted out to optical fiber 10.

The wavelength-multiplexed signal light from OLT 310 is split into N paths of power splitter 30 via optical fiber 10, and then transmitted to ONUs 330-1 to 330-N for the subscribers on the respective paths. Here, each ONU receives the optical signal with the downstream wavelength selected by wavelength control circuit 340 out of the wavelength-multiplexed signal light from the OLT. Also, each ONU transmits the optical signal to the OLT using the upstream wavelength selected by wavelength control circuit 340. The signal light from each ONU is combined at power splitter 30, and transmitted to OLT 310 via optical fiber 10. The signal light from the ONUs is demultiplexed by wavelength at wavelength multi/demultiplexer 312, and transmitted to the respective OSUs.

Figure 4:
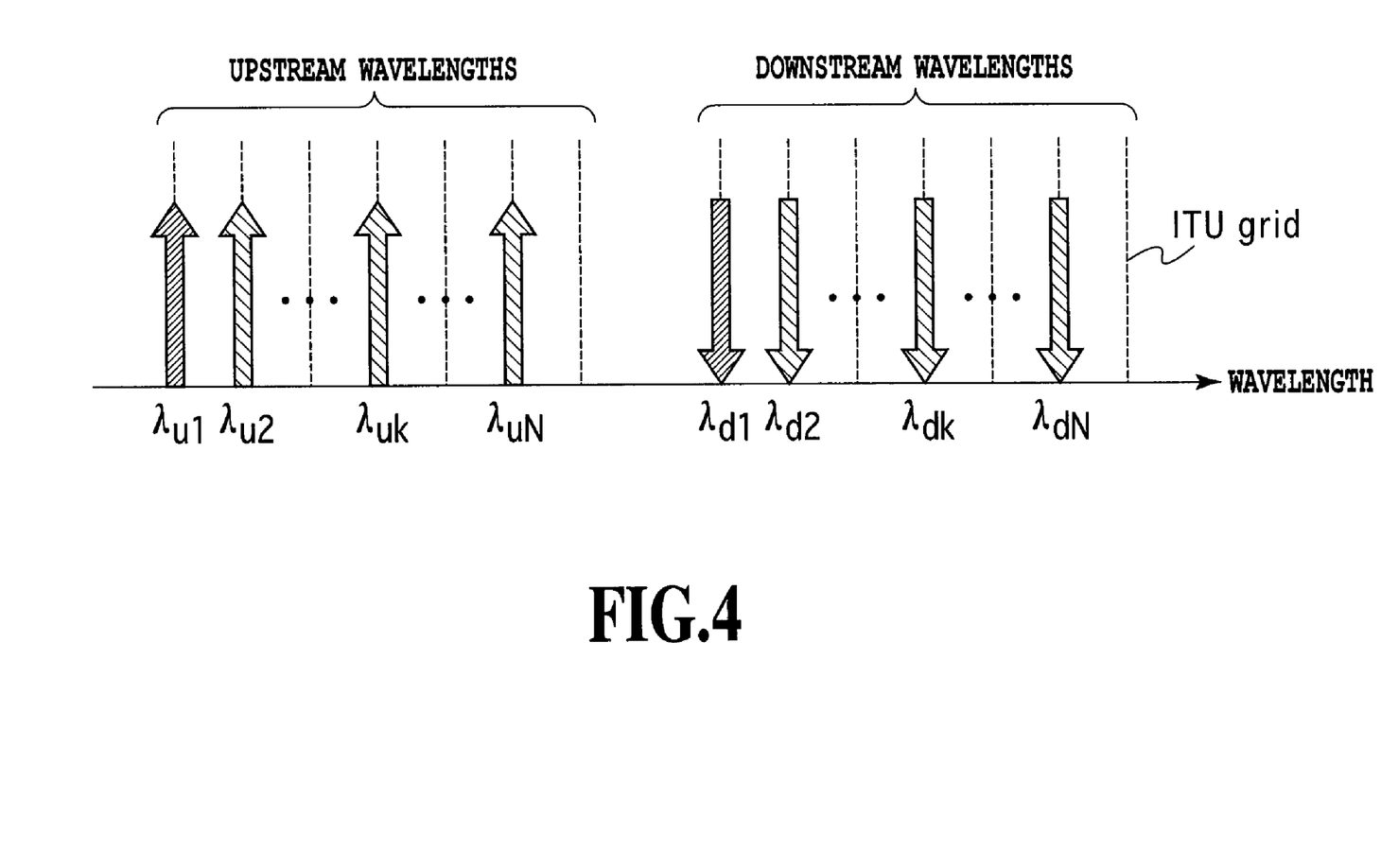
FIG. 4 is a diagram showing an example of wavelength allocation for upstream and downstream in a star-type wavelength multiplexed communication network according to an embodiment of the present invention.

FIG. 4 shows an example of wavelength allocation for upstream and downstream in such star-type network. As shown in the figure, the downstream wavelengths $\lambda_{d1}$ to $\lambda_{dN}$ and the upstream wavelengths $\lambda_{u1}$ to $\lambda_{uN}$ are allocated on the ITU grid. Although FIG. 4 shows an example of allocating the upstream wavelengths on the shorter wavelength side and the downstream wavelengths on the longer wavelength side, it should be noted that any arbitrary wavelength allocations may be used.

Figure 5:
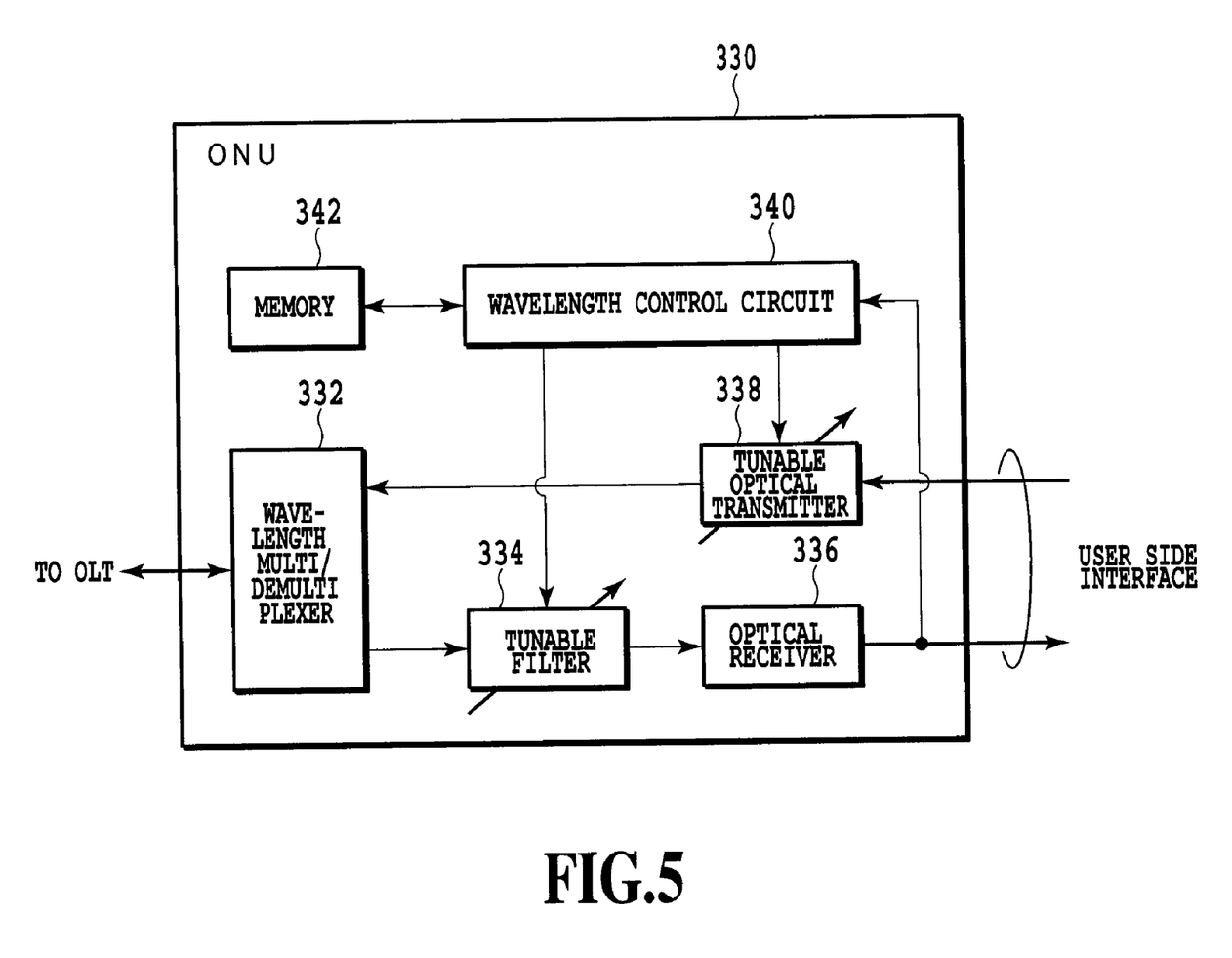
FIG. 5 is a diagram showing an exemplary configuration of ONU according to an embodiment of the present invention.

FIG. 5 shows an exemplary configuration of the ONU according to the present invention. ONU 330 transmits and receives the signal light with OLT 310 over the upstream and the downstream wavelengths. Wavelength multi/demultiplexer 332 multiplexes and demultiplexes the upstream wavelength and the downstream wavelength. A desired wavelength out of the wavelength-multiplexed downstream wavelengths is selected via tunable filter (TF) 334 in accordance with the assignment of wavelength control circuit 340. The signal light of the selected downstream wavelength is converted into an electric signal by optical receiver 336 and demodulated as a RX data signal.

On the other hand, the TX data signal is entered into tunable optical transmitter 338, and then transmitted as optical signal with a desired wavelength in accordance with assignment of wavelength control circuit 340. This upstream signal light is transmitted to the OLT via wavelength multi/demultiplexer 332.

Next, a procedure to assign the upstream and the downstream wavelengths between the OLT and the ONUs will be described in the exemplary configuration shown in FIGS. 3 and 5. Firstly, in the wavelength allocation of the upstream and the downstream in FIG. 4, assume that a pair of the upstream and the downstream wavelengths is assigned for each OSU and ONU as in the following wavelength assignment table (WAT).

[Table 1]

TABLE 1

Correspondence between upstream and downstream wavelengths and status of use

| Upstream wavelength | Downstream wavelength | Status |
|---|---|---|
| $\lambda_{u1}$ | $\lambda_{d1}$ | in use |
| $\lambda_{u2}$ | $\lambda_{d2}$ | not in use |
| ... | ... | ... |
| $\lambda_{uk}$ | $\lambda_{dk}$ | not in use |
| ... | ... | ... |
| $\lambda_{uN}$ | $\lambda_{dN}$ | not in use |

Each ONU memory 342 stores this correspondence table between the upstream wavelengths and the downstream wavelengths. By using this table to determine the status of use on the downstream wavelengths, the ONU can select the pair of the upstream and the downstream wavelengths not in use and initiate communication. Although this correspondence table shows only the in-use/not-in-use status of the pairs of wavelengths, it is not limited thereto, and the table may be maintained in association with which wavelength is assigned to which OSU and ONU pair so that quick countermeasures against failure may be taken, for example. Also, the table may be maintained in association with the wavelengths and the transmission rates so that multiple services with different transmission rates can be accommodated.

Figure 6:
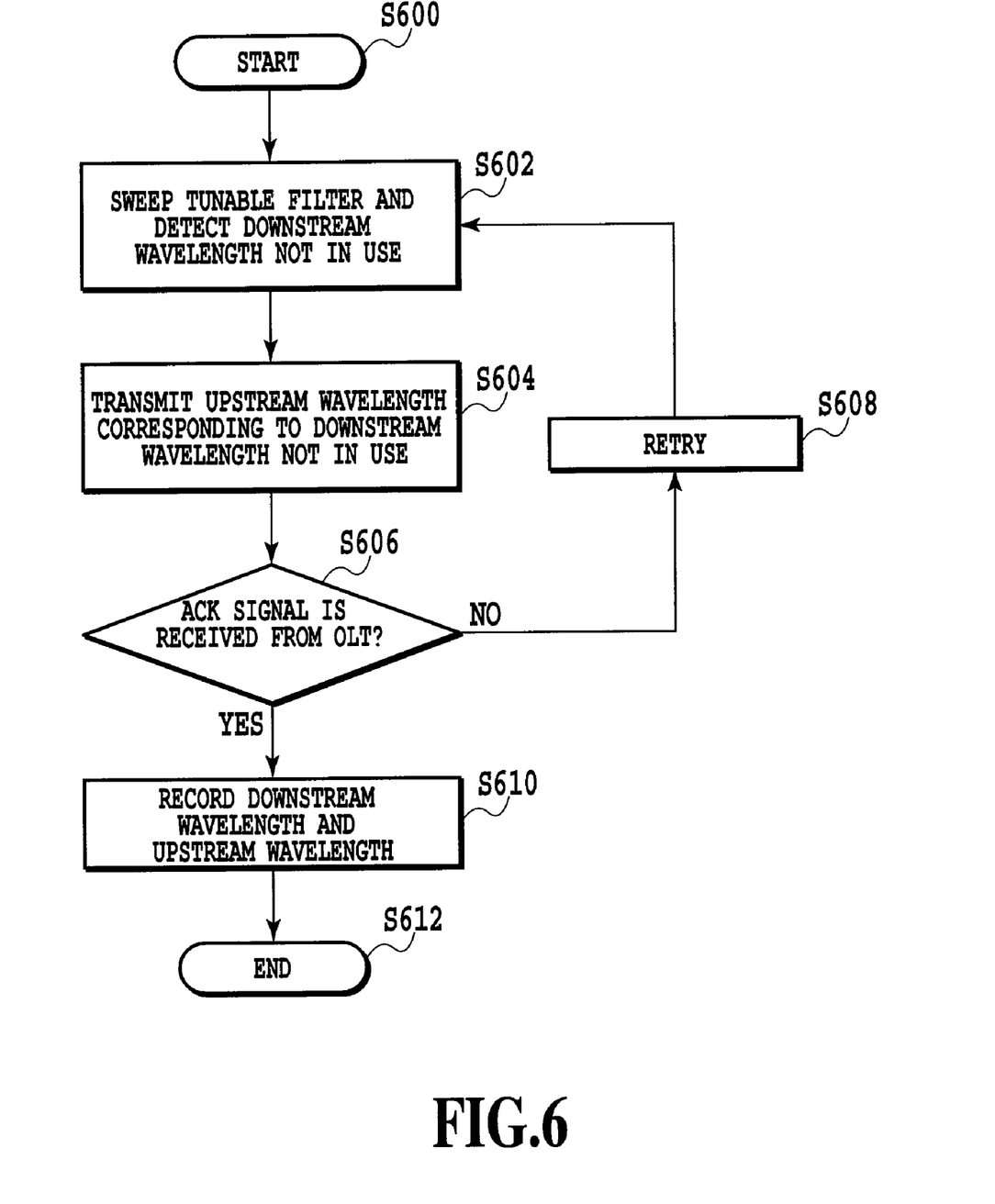
FIG. 6 is a flowchart showing a wavelength selection process between ONU and OLT according to an embodiment of the present invention.

FIG. 6 shows a process for an ONU selecting the wavelength based on this correspondence table. This wavelength selection process starts at S600. At S602, ONU 330 detects the downstream wavelengths not in use by sweeping tunable filter 334 through wavelength control circuit 340, and records them on the correspondence table in memory 342. Here, in detecting the wavelengths not in use, the channels may be detected as the downstream wavelengths not in use, which do not exceed a predetermined signal power ($P_{set}$), for example. Alternatively, a light emitting pattern for notifying a wavelength not in use may be predetermined, and when that pattern is detected at the ONU, it may be determined as not-in-use.

Further, while all of the downstream wavelengths not in use may be detected, at least one downstream wavelength not in use may be detected. Then, at S604, ONU 330 selects one downstream wavelength (e.g., $\lambda_{dk}$) out of the downstream wavelengths not in use through wavelength control circuit 340, and assigns tunable filter 334 to that wavelength. In conjunction therewith, the TX wavelength of tunable optical transmitter 338 is assigned to the upstream wavelength ($\lambda_{uk}$) corresponding to the downstream wavelength ($\mu_{dk}$) through wavelength control circuit 340, and then transmitted.

At S606, ONU 330 confirms presence or absence of the ACK signal back from OLT 310 on the downstream wavelength ($\lambda_{dk}$) assigned at tunable filter 334. If the ACK signal is not confirmed within a predetermined period of time, the detection of the downstream wavelength not in use is performed again via S608, and the optical signal with the corresponding upstream wavelength is then transmitted. In this case, the detection may be performed again including the same pair of wavelengths ($\lambda_{dk}$ and $\lambda_{uk}$) not in use as in the previous turn, or the selection is made among the pairs of wavelengths not in use different from those in the previous turn. Further, by repeating this retransmission process after a random period of time, the probability can be reduced in selecting the same wavelength as other ONUs so that conflict at the OLT can be reduced.

If the ACK signal from the OLT is received on the downstream wavelength (e.g., $\lambda_{dk}$) assigned at tunable filter 334, ONU 330 sets the pair of downstream and the upstream wavelengths ($\lambda_{dk}$ and $\lambda_{uk}$) in memory 342 as the wavelengths to be used for TX and RX, and initiates communication at S610. ONU 330 then terminates the wavelength selection process at S612. After completion of the communication between the OSU and the ONU, the set pair of wavelengths may be released and the wavelength selection process may newly be performed at the time of the next communication, otherwise the set pair of wavelengths may fixedly be used between the certain OSU and ONU.

As described hereinabove, according to the wavelength selection process of the present invention, the initial wavelength assignment can be performed with a simple algorithm without using monitoring light in a star-type wavelength multiplexed communication network.

(Retransmission Process with Random Delay)

Figure 7:
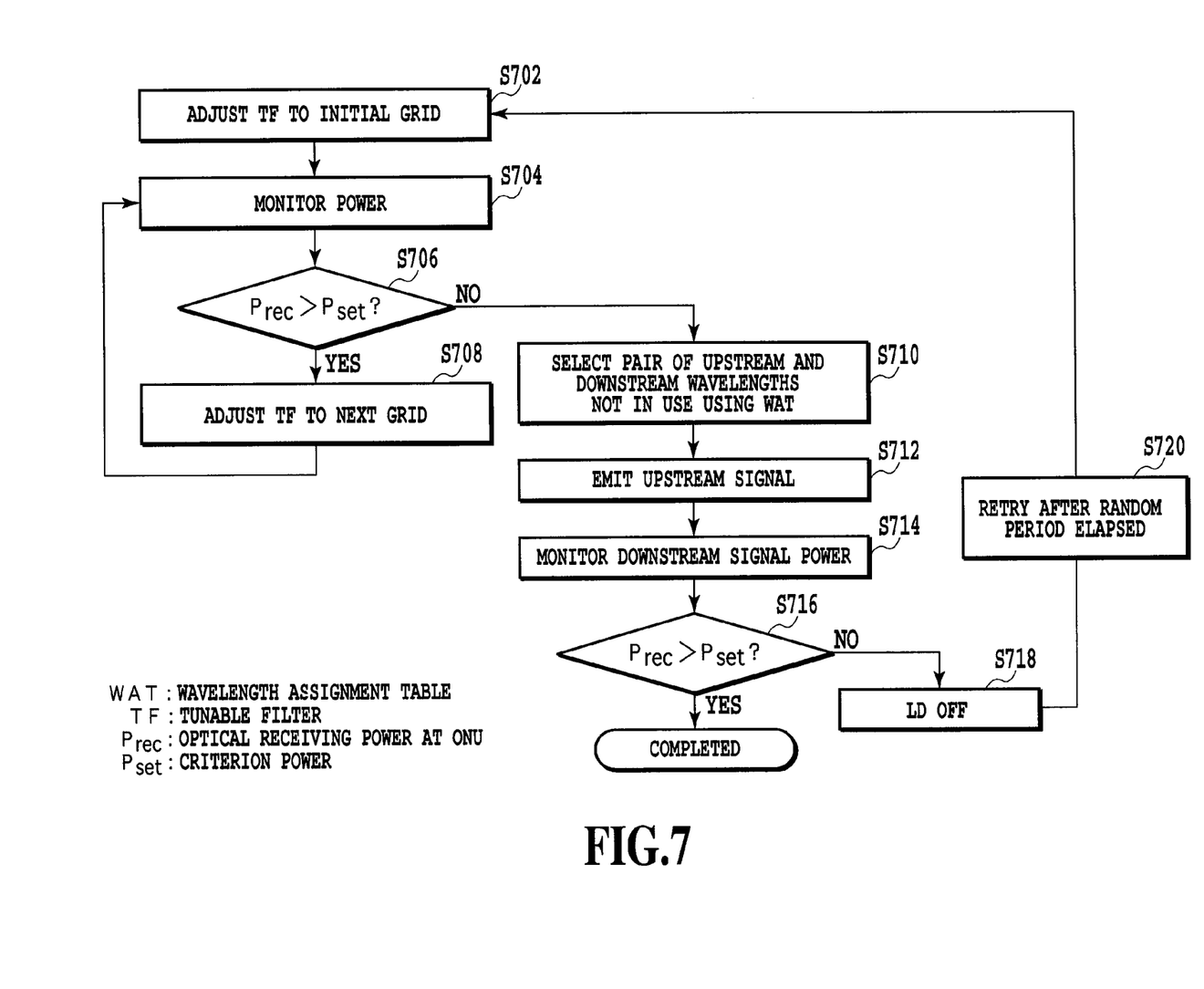
FIG. 7 is a flowchart showing a wavelength selection process for randomly selecting a delay time between ONU and OLT according to an embodiment of the present invention.

Next, as a retransmission process in the case of no response, a method for selecting a pair of wavelengths not in use after a random delay will be described. FIG. 7 shows this process. Firstly, at S702, ONU 330 assigns tunable filter (TF) 334 to an initial wavelength grid by wavelength control circuit 340. At S704, ONU 330 monitors the RX power ($P_{rec}$) on the assigned grid.

Then, at S706, it is determined whether or not the monitored RX power is greater than a criterion power ($P_{set}$), and if it is greater, it is determined that the wavelength is in-use, and tunable filter 334 is assigned to the next grid by wavelength control circuit 340 and returned to S704 to monitor the RX power of this wavelength. At S706, if the monitored RX power is weaker than the predetermined criterion power, the grid is detected as not-in-use, and a pair of upstream and downstream wavelengths corresponding to this grid is selected using the wavelength assignment table (WAT) (S710).

At S712, ONU 330 assigns the TX wavelength of tunable optical transmitter 338 to the upstream wavelength of the selected pair of wavelengths by wavelength control circuit 340, and transmits the optical signal towards the OLT. Further, at S714, ONU 330 assigns the RX wavelength of tunable filter 334 to the downstream wavelength of the selected pair of wavelengths by wavelength control circuit 340, and monitors the optical signal from the OLT. If a greater RX power ($P_{rec}$) than the predetermined criterion power ($P_{set}$) is detected on the selected downstream wavelength or the ACK signal from the OLT is detected, ONU 330 sets the selected pair of wavelengths for communication, and completes the wavelength selection process. Otherwise, ONU 330 stops transmission from tunable optical transmitter (LD) 338 in S718, and waits for a random period of time to elapse at S720, and then, repeats the wavelength selection process from the beginning by returning to S702.

Figure 8:
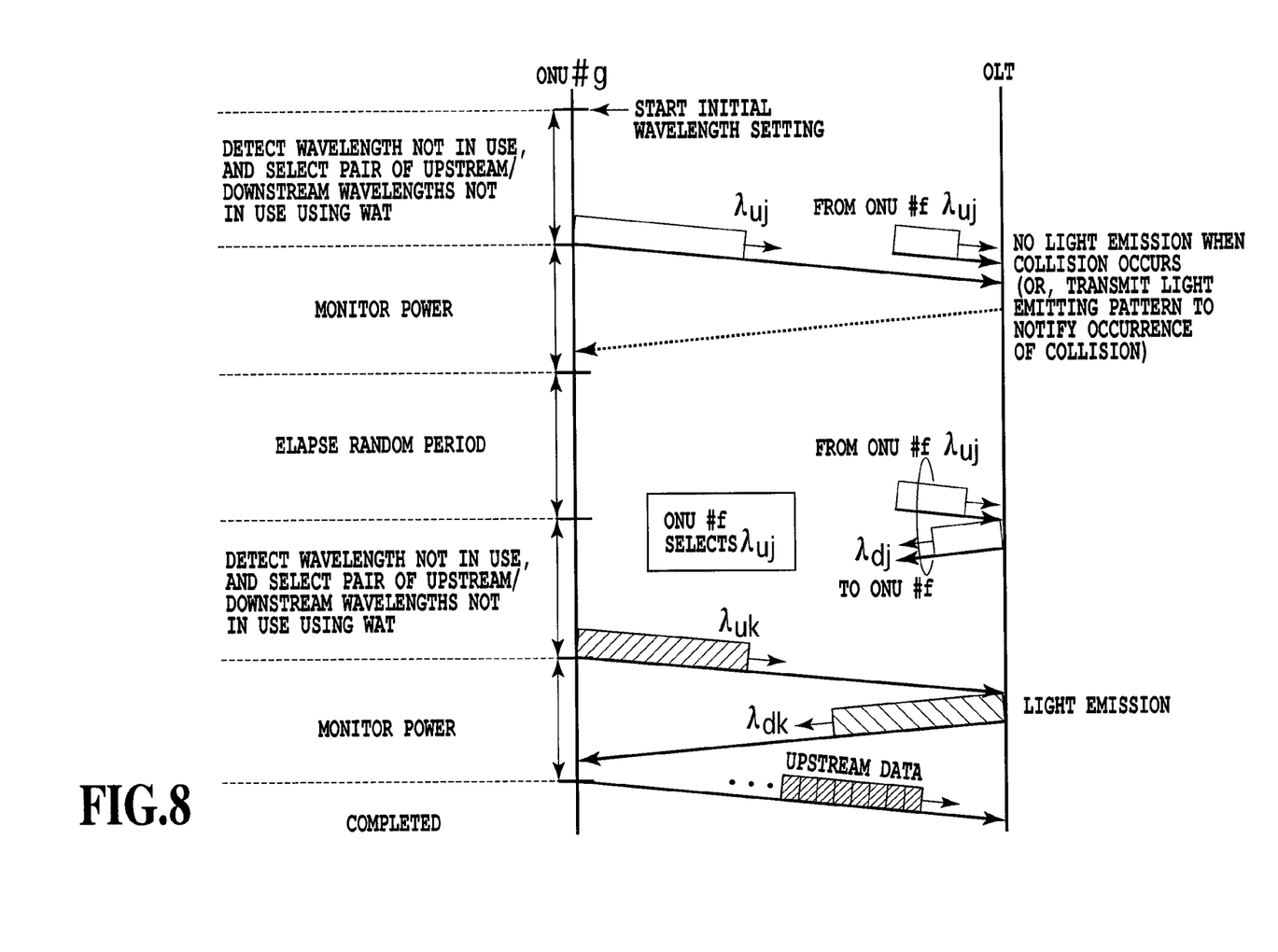
FIG. 8 is a time chart showing a wavelength selection process for randomly selecting a delay time between ONU and OLT according to an embodiment of the present invention.
Figure 9:
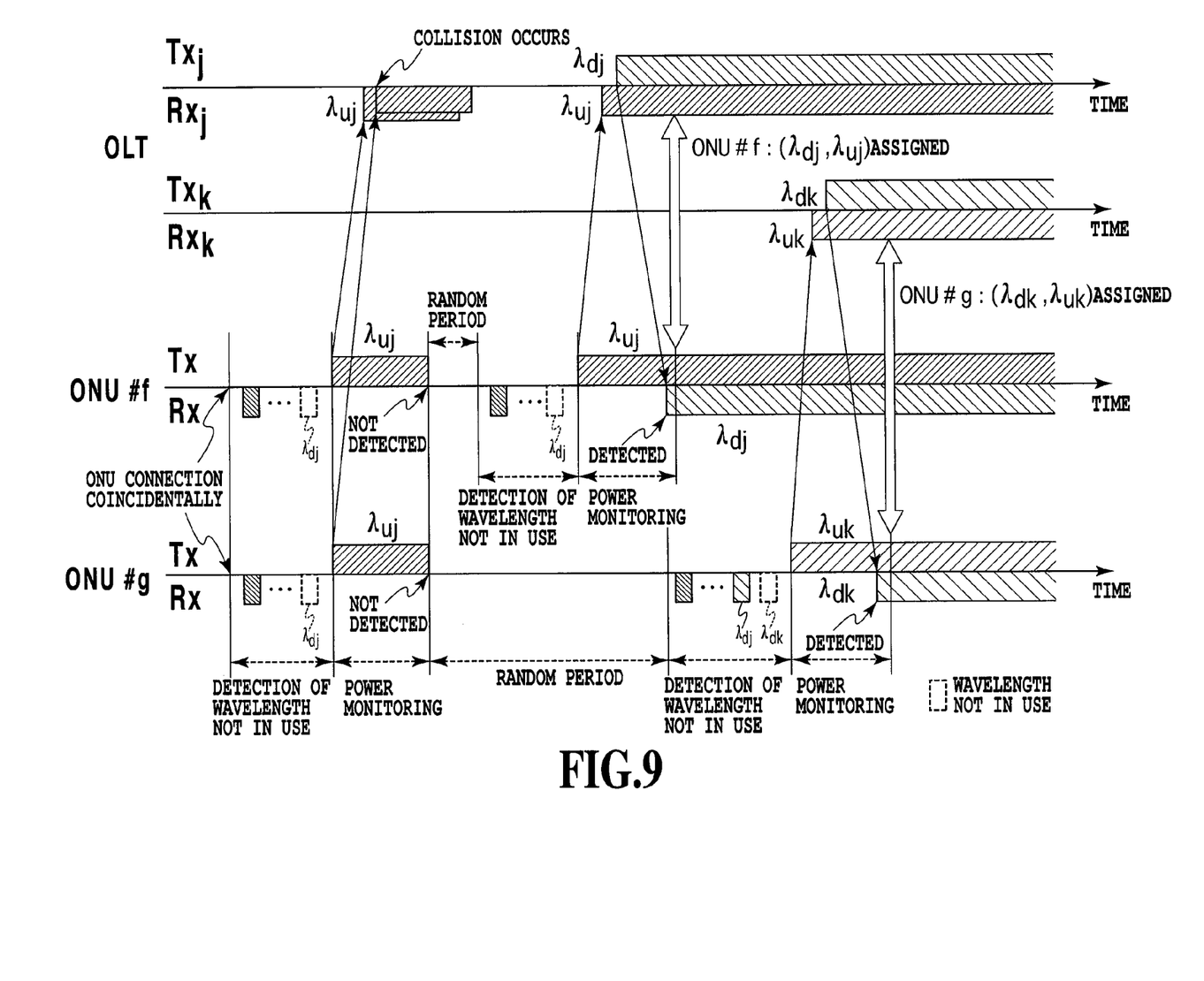
FIG. 9 is another time chart showing a wavelength selection process for randomly selecting a delay time between ONU and OLT according to an embodiment of the present invention.

Next, with reference to FIGS. 8 and 9, the operation is described in which ONU #g and ONU #f access the OLT at the same time. Assume that the ONU #g and the ONU #f perform the detection of wavelengths not in use, and select the same pair of wavelengths ($\lambda_{uj}$ and $\lambda_{dj}$). If the two ONUs coincidentally transmit the same upstream wavelength ($\lambda_{uj}$) to the OLT, a collision on the upstream wavelength occurs at the OLT. When the collision occurs, the occurrence of the collision may be notified to the ONU by not generating the downstream signal from the OLT, or it may take a form of action that the ONU retries if a certain light emitting pattern predetermined for notifying the occurrence of the collision is detected. The OLT is required to have a mechanism for detecting the occurrence of the collision, the means therefor is not limited. For example, by monitoring errors, it may be determined that the collision has occurred if the light power is greater than a predetermined value but the error is worse than a specified value, or by monitoring the clock extracted from the CDR (clock data recovery) circuit, it may be determined that the collision has occurred if the light power is greater than a predetermined value but the clock output is not normal. In the example of FIGS. 8 and 9, if the collision occurs, each of the two ONUs #f and #g performs the detection of the wavelengths not in use to select a pair of wavelengths not in use after a random period of time has elapsed. If the random periods of time are different between the ONUs #f and #g, the collision at the OLT would not occur, each selecting a different pair of wavelengths. In FIGS. 8 and 9, the ONU #f selects the pair of wavelengths $\lambda_{uj}$ and $\lambda_{dj}$ first, and then, the ONU #g selects the pair of wavelengths $\lambda_{uk}$ and $\lambda_{dk}$. The two ONUs having the responses can communicate with the OLT thereafter using the respective pairs of wavelengths.

(Retransmission Process with Random Wavelength Selection)

Figure 10:
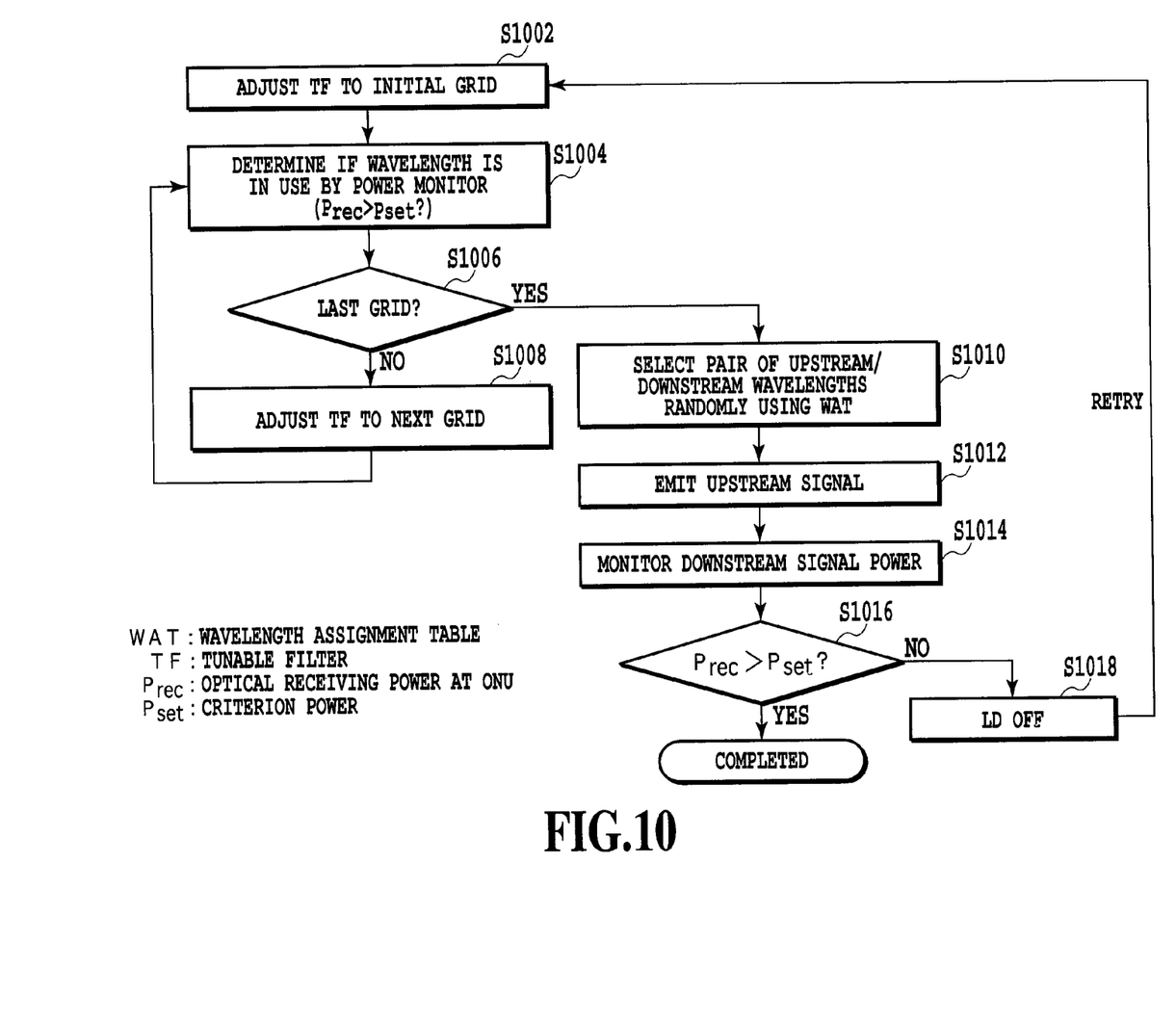
FIG. 10 is a flowchart showing a wavelength selection process for randomly selecting a wavelength between ONU and OLT according to an embodiment of the present invention.

Next, as a retransmission process in the case of no response, a method will be described, which randomly selects a pair of wavelengths to use out of pairs of wavelengths not in use. FIG. 10 shows this process. Firstly, at S1002, ONU 330 assigns tunable filter (TF) 334 to an initial wavelength grid by wavelength control circuit 340. At S1004, ONU 330 monitors the RX power ($P_{rec}$) on the assigned grid, and if the greater signal than a predetermined criterion power ($P_{set}$) is detected, it is determined that the wavelength is in use.

Then, at S1006, it is determined whether or not the monitored grid is the last grid, and if not, tunable filter 334 is assigned to the next grid by wavelength control circuit 340, and it is determined whether or not the present wavelength is now in use returning to S1004. If the monitored grid is the last grid at S1006, a pair of upstream and downstream wavelengths is randomly selected from the detected pairs of wavelengths not in use using the wavelength assignment table (WAT) (S1010).

At S1012, ONU 330 assigns the TX wavelength for tunable optical transmitter 338 to the upstream wavelength of the selected pair of wavelengths by wavelength control circuit 340, and transmits the optical signal towards the OLT.

Further, at S1014, ONU 330 assigns the RX wavelength for tunable filter 334 to the downstream wavelength of the selected pair of wavelengths by wavelength control circuit 340, and monitors the optical signal from the OLT. If a greater RX power ($P_{rec}$) than the predetermined criterion power ($P_{set}$) is detected at the selected downstream wavelength or the ACK signal from the OLT is detected, ONU 330 sets the selected pair of wavelengths for communication, and completes the wavelength selection process. Otherwise, ONU 330 stops the transmission from tunable optical transmitter (LD) 338 at S1018, and repeats the wavelength selection process from the beginning by returning to S1002. In this case, similarly to the retransmission process with the random delay described above, the retransmission process may be retried after the random period of time has elapsed.

Figure 11:
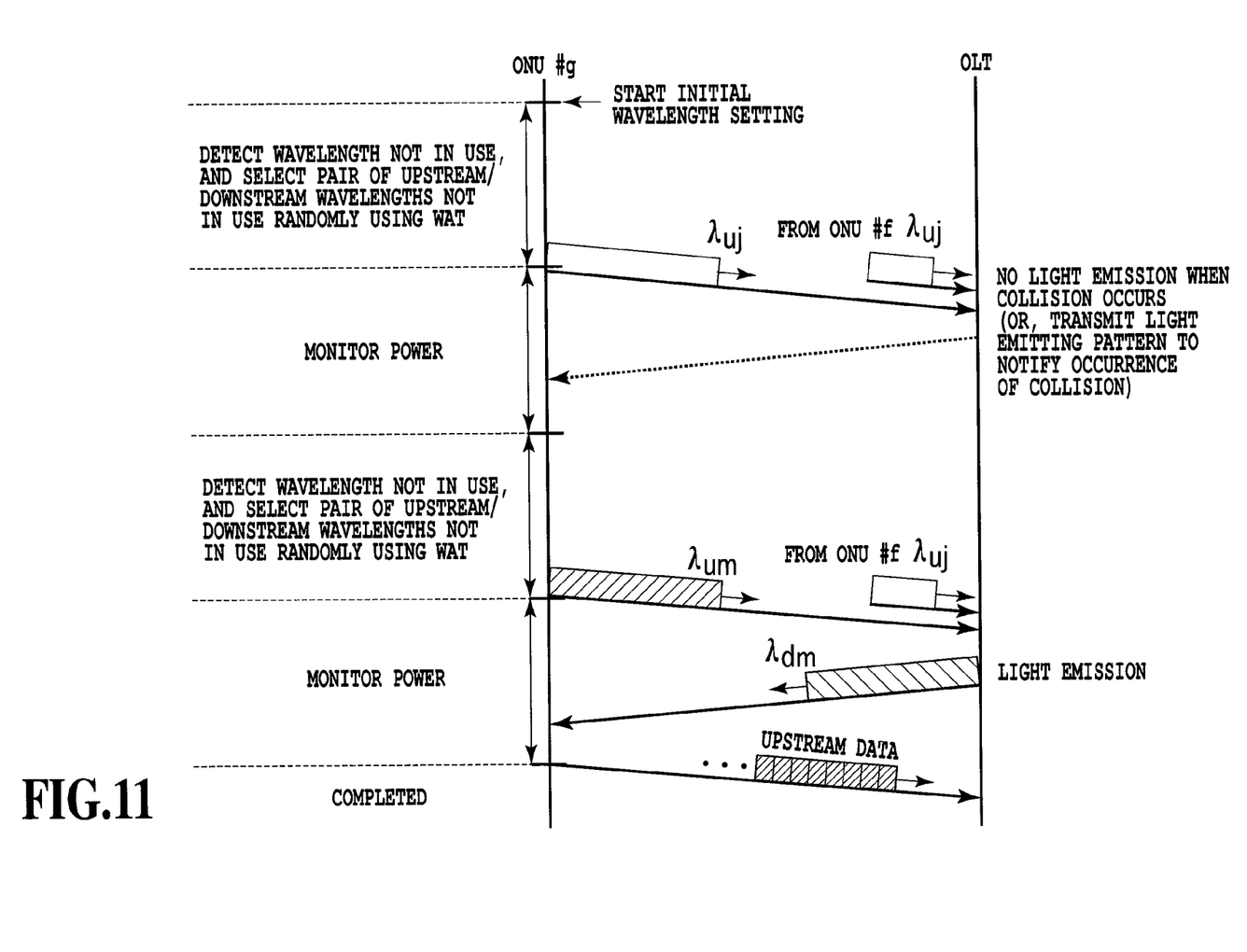
FIG. 11 is a time chart showing a wavelength selection process for randomly selecting a wavelength between ONU and OLT according to an embodiment of the present invention.
Figure 12:
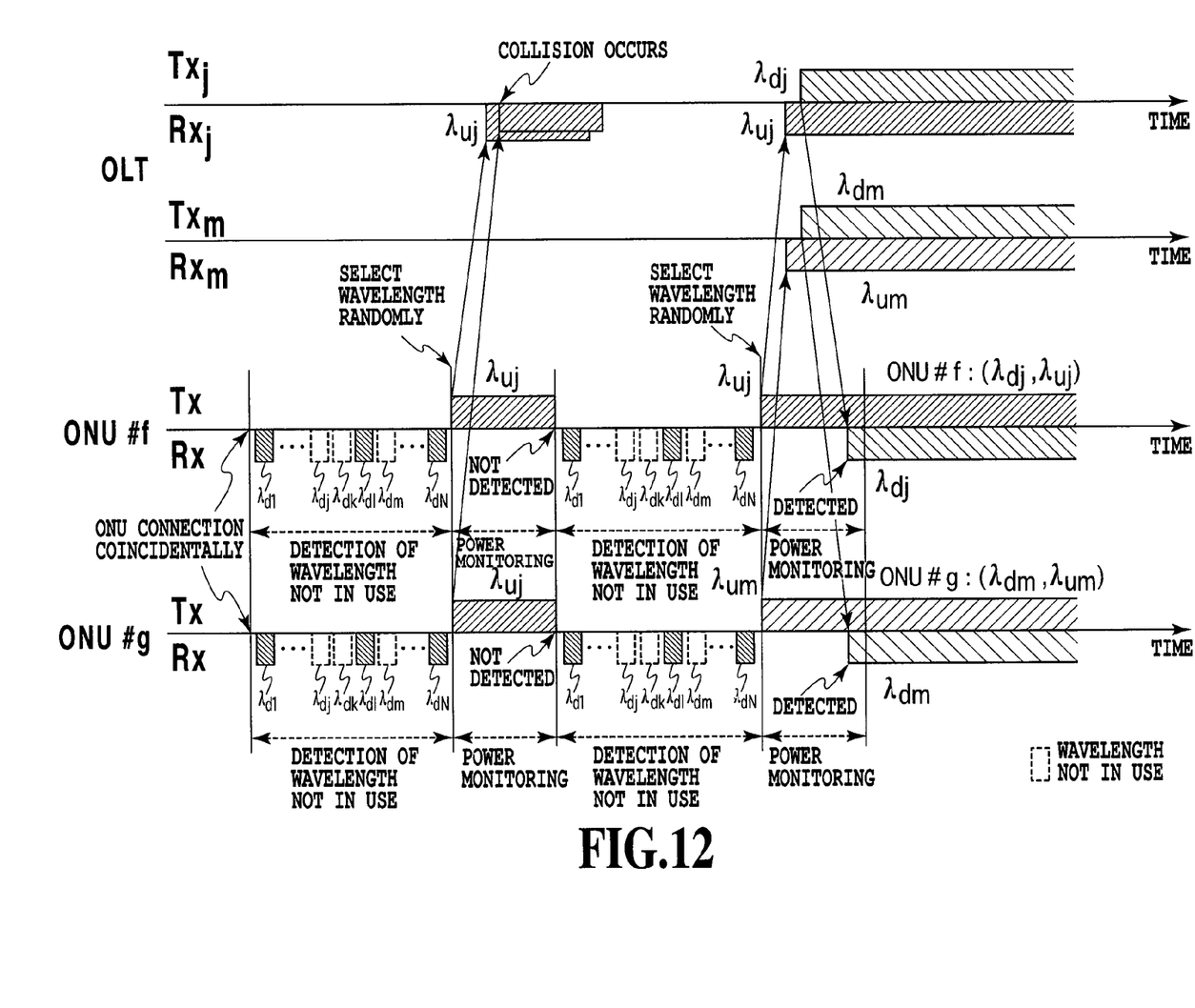
FIG. 12 is another time chart showing a wavelength selection process for randomly selecting a wavelength between ONU and OLT according to an embodiment of the present invention.

Next, with reference to FIGS. 11 and 12, the operation is described in which ONU#g and ONU#f access OLT at the same time. Assume that the ONU#g and the ONU#f perform the detection of the wavelengths not in use, and select the same pair of wavelengths ($\lambda_{uj}$ and $\lambda_{dj}$). If the two ONUs coincidentally transmit the same upstream wavelength ($\lambda_{uj}$) to the OLT, a collision on the upstream wavelength occurs at the OLT.

When the collision occurs, the occurrence of the collision may be notified to the ONU by not generating the downstream signal from the OLT, or it may take a form of action that the ONU retries if a certain light emitting pattern predetermined for notifying the occurrence of the collision is detected. The OLT is required to have a mechanism for detecting the occurrence of the collision, the means therefor is not limited. For example, by monitoring errors, it may be determined that the collision has occurred if the light power is greater than a predetermined value but the error is worse than a specified value, or by monitoring the clock extracted from the CDR (clock data recovery) circuit, it may be determined that the collision has occurred if the light power is greater than a predetermined value but the clock output is not normal. In the example of FIGS. 11 and 12, each of the two ONUs #f and #g performs the detection of the wavelengths not in use, and each selects a pair of wavelengths randomly. If the pairs of wavelengths are different from each other, the OLT transmits the optical signals for responses with the corresponding downstream wavelengths to the ONUs, respectively. In FIGS. 11 and 12, the ONU #f selects the pair of wavelengths $\lambda_{uj}$ and $\lambda_{dj}$, and the ONU #g selects the pair of wavelengths $\lambda_{um}$ and $\lambda_{dm}$. The two ONUs receiving the responses can communicate with the OLT thereafter using the respective pairs of wavelengths.

Hereinabove, the present invention is specifically described with certain embodiments. However, in view of many embodiments applicable for the principle of the present invention, the embodiments described herein are merely examples and are not intended to limit the scope of the invention. The embodiments illustrated herein may be modified in the configurations and details without departing from the scope of the present invention. Further, components and procedures for the purpose of descriptions may be modified, supplemented, or reordered without departing from the scope of the present invention.

The invention claimed is:

1. An optical TX/RX device for transmitting and receiving wavelength-multiplexed signal light, comprising:
   an optical RX means capable of varying a RX wavelength;
   an optical TX means capable of varying a TX wavelength;
   a detection means for detecting RX wavelengths not in use via the optical RX means;

a storage means provided with a correspondence table between the RX wavelengths selectable for the optical RX means and the TX wavelengths selectable for the optical TX means; and a wavelength control means for assigning one of the RX wavelengths detected by the detection means to the RX wavelength of the optical RX means and for assigning a TX wavelength corresponding to the RX wavelength assigned based on the correspondence table in the storage means to the TX wavelength of the optical TX means, wherein, upon assigning the RX wavelength assigning the TX wavelength of the optical TX means, the optical TX means is configured to transmit an optical signal on the assigned TX wavelength, and the optical TX/RX device is configured to initiate communication using the optical TX means with the assigned TX wavelength and the optical RX means with the assigned RX wavelength if the optical RX means receives a response signal on the assigned RX wavelength to the optical signal transmitted from the optical TX means on the assigned TX wavelength.

2. The optical TX/RX device according to claim 1, wherein the optical RX means comprises:
a tunable filter capable of varying the RX wavelength, and
an optical receiver for receiving the RX wavelength through the tunable filter.

3. A network comprising:
a plurality of the optical TX/RX devices according to claim 2; and
an optical line terminal connected with the plurality of the optical TX/RX devices via a power splitter.

4. The optical TX/RX device according to claim 1, wherein the detection means scans the RX wavelengths selectable for the optical RX means and detects the RX wavelengths not in use by measuring RX power on each RX wavelength.

5. A network comprising:
a plurality of the optical TX/RX devices according to claim 4; and
an optical line terminal connected with the plurality of the optical TX/RX devices via a power splitter.

6. The optical TX/RX device according to claim 1, wherein the optical TX/RX device is configured to detect the wavelengths not in use by the detection means, to assign one of the detected RX wavelengths to the RX wavelength of the optical RX means by the wavelength control means and to assign a TX wavelength corresponding to the RX wavelength to the TX wavelength of the optical TX means, after a random period of time has elapsed, if the optical RX means receives no response signal.

7. A network comprising:
a plurality of the optical TX/RX devices according to claim 1; and
an optical line terminal connected with the plurality of the optical TX/RX devices via a power splitter.

8. The optical TX/RX device according to claim 1, wherein the optical TX/RX device is configured to detect the wavelengths not in use by the detection means, to randomly assign one of the detected RX wavelengths to the RX wavelength of the optical RX means by the wavelength control means and to assign a TX wavelength corresponding to the RX wavelength to the TX wavelength of the optical TX means, if the optical RX means receives no response signal.

9. A network comprising:
a plurality of the optical TX/RX devices according to claim 8; and
an optical line terminal connected with the plurality of the optical TX/RX devices via a power splitter.

10. A network comprising:
a plurality of the optical TX/RX devices according to claim 1; and
an optical line terminal connected with the plurality of the optical TX/RX devices via a power splitter.

11. A method of assigning wavelengths for an optical TX/RX device in a network including a plurality of optical TX/RX devices capable of varying respective upstream and downstream wavelengths, and an optical line terminal connected with the plurality of optical TX/RX devices via a power splitter, wherein each optical TX/RX device comprises a memory including a correspondence table between downstream wavelengths and upstream wavelengths, the method comprising:
(a) detecting downstream wavelengths not in use by detecting presence or absence of the downstream wavelengths from the optical line terminal via the power splitter;
(b) selecting one of the detected downstream wavelengths;
(c) selecting an upstream wavelength corresponding to the selected downstream wavelength based on the correspondence table in the memory;
(d) transmitting a signal light on the selected upstream wavelength;
(e) detecting a response to the transmitted signal light on the selected downstream wavelength; and
(f) initiating communication with the optical line terminal using the selected downstream wavelength and the selected upstream wavelength if the response is detected.

12. The method of assigning wavelengths according to claim 11, comprising:
(g) repeating the steps (a) to (e) if the response is not detected.

13. The method of assigning wavelengths according to claim 12, wherein the repeating step (g) repeats the steps (a) to (e) after a random period of time has elapsed.

14. The method of assigning wavelengths according to claim 13, wherein selecting step (b) selects a downstream wavelength randomly out of the detected downstream wavelengths.

15. The method of assigning wavelengths according to claim 12, wherein selecting step (b) selects a downstream wavelength randomly out of the detected downstream wavelengths.

16. The method of assigning wavelengths according to claim 11, wherein selecting step (b) selects a downstream wavelength randomly out of the detected downstream wavelengths.

17. An optical TX/RX device for transmitting and receiving wavelength-multiplexed signal light, comprising:
an optical RX means capable of varying a RX wavelength;
an optical TX means capable of varying a TX wavelength;
a detection means for detecting RX wavelengths not in use via the optical RX means;
a storage means provided with a correspondence table between the RX wavelengths selectable for the optical RX means and the TX wavelengths selectable for the optical TX means; and
a wavelength control means for assigning one of the RX wavelengths detected by the detection means to the RX wavelength of the optical RX means and for assigning a TX wavelength corresponding to the RX wavelength assigned based on the correspondence table in the storage means to the TX wavelength of the optical TX means, wherein the optical TX means transmits an optical signal on the assigned TX wavelength, the optical RX means receives a response signal to the optical signal on the assigned RX wavelength, the optical TX/RX device initiates communication using the optical TX means with the assigned TX wavelength and the optical RX means with the assigned RX wavelength if the optical RX means receives the response signal, and the optical TX/RX device is configured to detect the wavelengths not in use by the detection means, to assign one of the detected RX wavelengths to the RX wavelength of the optical RX means by the wavelength control means, and to assign a TX wavelength corresponding to the RX wavelength to the TX wavelength of the optical TX means, after a random period of time has elapsed, if the optical RX means receives no response signal.

18. An optical TX/RX device for transmitting and receiving wavelength-multiplexed signal light, comprising:

an optical RX means capable of varying a RX wavelength;

an optical TX means capable of varying a TX wavelength;

a detection means for detecting RX wavelengths not in use via the optical RX means;

a storage means provided with a correspondence table between the RX wavelengths selectable for the optical RX means and the TX wavelengths selectable for the optical TX means; and a wavelength control means for assigning one of the RX wavelengths detected by the detection means to the RX wavelength of the optical RX means and for assigning a TX wavelength corresponding to the RX wavelength assigned based on the correspondence table in the storage means to the TX wavelength of the optical TX means, wherein the optical TX means transmits an optical signal on the assigned TX wavelength, the optical RX means receives a response signal to the optical signal on the assigned RX wavelength, the optical TX/RX device initiates communication using the optical TX means with the assigned TX wavelength and the optical RX means with the assigned RX wavelength if the optical RX means receives the response signal, and the optical TX/RX device is configured to detect the wavelengths not in use by the detection means, to randomly assign one of the detected RX wavelengths to the RX wavelength of the optical RX means by the wavelength control means, and to assign a TX wavelength corresponding to the RX wavelength to the TX wavelength of the optical TX means, if the optical RX means receives no response signal.

* * * * *